United States Patent Office 2,810,456
Patented Oct. 22, 1957

2,810,456

PRODUCTION OF CHEMICALS

Frank Maslan, Brookline, Mass., assignor, by mesne assignments, to Escambia Chemical Corporation, Pace, Fla., a corporation of Delaware No Drawing. Application June 1, 1954, Serial No. 433,805

8 Claims. (Cl. 183—115)

The present invention relates to the production of chemicals and more particularly to an improved separation of hydrogen peroxide from a gaseous stream resulting from the oxidation of saturated hydrocarbons.

It is a well-recognized fact that hydrogen peroxide has been broadly utilized in the commercial world. This situation has caused the workers in the art to spend considerable time and energy in attempting to arrive at cheaper and more efficient methods of manufacturing hydrogen peroxide. However, with the arrival of such methods, there also came the more complicated problems of separating the hydrogen peroxide from the other valuable compounds produced.

Accordingly, a principal object of this invention is to provide a novel process for separating hydrogen peroxide from gaseous mixtures containing hydrogen peroxide as well as acetaldehyde and formaldehyde.

Another object of this invention is to provide a separation process which is simple and economical to operate.

These and other objects of the invention will in part be obvious and will in part appear hereinafter.

For a fuller understanding of the nature and objects of the invention, reference should be had to the following detained description.

In the present invention, hydrogen peroxide is recovered from gaseous mixtures containing hydrogen peroxide, acetaldehyde and formaldehyde. This mixture is preferably produced by the partial oxidation of ethane, as more fully described and claimed by Gardner et al. in the copending application Serial No. 370,065, filed July 24, 1953, now Patent No. 2,775,510, dated December 25, 1956. While such a process provides excellent yields of hydrogen peroxide, the effluent gaseous stream leaving the reactor contains other valuable chemicals such as considerable quantities of acetaldehyde and formaldehyde.

It has been ascertained that the hydrogen peroxide content can be separated from a gaseous stream containing hydrogen peroxide and the above-mentioned aldehydes if the gaseous stream is subjected to a scrubbing operation under conditions which provide for substantial and immediate intermixing of the gaseous stream with a suitable scrubbing medium. As a result of this intimate intermixing, the hydrogen peroxide either enters into a liquid phase or chemically reacts with the scrubbing medium so that it can be easily and rapidly separated from the gaseous stream containing the aldehydes and the other remaining constituents.

Time is a most important consideration. The process must be carried out rapidly not only because of the usual economic factors but also because of the fact that hydrogen peroxide will react with formaldehyde and acetaldehyde if allowed to remain in contact for even a comparatively short space of time. Thus one preferred embodiment of the present invention is to provide an extremely rapid separation of hydrogen peroxide from the gaseous stream. The total contact time between the hydrogen peroxide and the aldehydes is preferably on the order of about one minute or less. By total time, it is meant to include only that portion of time from the intermixing of the gaseous stream with a suitable scrubbing medium to the completion of the separation of hydrogen peroxide in the liquid phase or a slurry comprising an alkaline earth metal peroxide from the gaseous stream. It has been found that, if this limit is exceeded, there will be a substantial decrease in the hydrogen peroxide yield.

Temperature, as well as time, is another important consideration, since hydrogen peroxide and any organic peroxides present are prone to decompose when subjected to a temperature of 20° C. or higher.

In another preferred embodiment of the invention, a scrubber in the form of a Venturi tube is used to intermix the gaseous stream with a scrubbing medium. The Venturi scrubber greatly increases the velocity of the gaseous stream passing through it, resulting in rapid and thorough intermixing of the gaseous stream with an introduced scrubbing medium. It is further preferred that the velocity of the gaseous stream, on being initiated into the Venturi throat, should be on the order of about 100 to 500 feet per second. The gaseous phase and peroxide-bearing phase leaving the Venturi scrubber are preferably passed immediately to a separator so that the phase containing either hydrogen peroxide in the liquid phase or alkaline earth metal peroxide is removed from contact with the aldehyde-bearing gaseous stream.

The scrubbing medium is preferably introduced into the throat of the Venturi scrubber so as to pass through the accelerating area and therein make contact with the gaseous product mixture. As acceptable scrubbing media there may be used water, oils such as white mineral oils, and alkaline earth metal oxide and hydroxide slurries which can form alkaline earth metal peroxides by reacting with hydrogen peroxide. When using water or oils as the scrubbing medium, highest yields were obtained when approximately one gallon of liquid per 1000 cubic feet of gas were used. When using one of the above-mentioned slurries (e. g., lime) as a scrubbing medium, more liquid, approximately 10 gallons per 1000 cubic feet of gas, was preferably used with complete intermixing.

An equally important consideration, as mentioned previously, is temperature, owing to the fact that hydrogen peroxide will decompose when exposed to a temperature above 20° C. It has been found most advantageous to keep the temperature of the Venturi scrubber and its connected separator preferably between 0° C. to 10° C. This is preferably done by introducing a pre-refrigerated scrubbing medium. Any convenient refrigerant may be used which will cool the scrubbing medium to a preferred temperature between 0° C. to 5° C. This latter temperature was arrived at by considering particular economic and technological conditions and may be varied considerably to take advantage of the lower freezing points of scrubbing mediums such as white mineral oils or slurries of alkaline earth metal oxides or hydroxides which can form the corresponding peroxide on reaction with hydrogen peroxide.

A centrifugal type separator such as a cyclone separator is preferred to separate the peroxide-bearing phase from the gaseous stream after they have passed through the Venturi scrubber. In such a separator the peroxide-bearing phase, which may contain hydrogen peroxide either in the liquid phase or as an alkaline earth metal peroxide, is continuously removed while the gaseous phase is routed out for further processing. This preferred type of separator performs a very rapid separation and so takes advantage of the refrigerated state of the peroxide-bearing phase and the gaseous aldehydes, thereby reducing reaction between these two which results on prolonged contact. It is preferred that the separation and the removal take place within one minute, and more preferably within ten seconds, of the time of the introduction of the two phases into the separator. The total time from the intermixing in the scrubber to the removal of the liquid-containing hydrogen peroxide or the slurry comprising an alkaline metal peroxide is preferably on the order of about one minute or less.

A more detailed description of this invention is given in the following non-limiting examples in which the Venturi scrubber utilized had a 0.1 inch diameter throat, an upstream angle of 30°, a downstream angle of 7°, and a 0.1 inch diameter inlet tube for the scrubbing medium located 0.1 inch downstream of the throat. A cyclone type separator whose top diameter measures 2.75 inches was intimately connected to the Venturi scrubber by means of a tangentially set entrance tube, the diameter of which is 0.375 inch. The over-all length of the separator was 6.25 inches while the upper orifice, centrally placed, was 1.0 inches in diameter and the lower orifice was 0.25 inch in diameter. The total residence time of the gaseous mixture in both the Venturi scrubber and the separator was on the order of 0.02 second and the total residence time of the peroxide-bearing phase was on the order of less than one second.

The results obtained in the following examples were arrived at in runs which were of one-hour duration.

*Example I*

0.0143 gallon per minute of a water scrubbing solution which had been refrigerated to 10° C. were introduced into a Venturi scrubber of the above description at the inlet tube located 0.1 inch downstream of the throat. Simultaneously, a 1.74 cubic foot per minute stream of a gaseous mixture containing hydrogen peroxide and formaldehyde was passed through the Venturi scrubber. After the rapid inter-mixing of the water scrubbing solution and the gaseous mixture, the resulting mixture of liquid and gases leaving the Venturi scrubber was immediately passed into a cyclone type separator of the above description. After the rapid separation of the liquid phase from the gaseous phase, it was found that the quantity of hydrogen peroxide contained in the liquid phase equalled 86.8 weight percent of the hydrogen peroxide present in the gaseous mixture introduced into the Venturi scrubber.

*Example II*

0.0036 gallon per minute of an inert white mineral oil scrubbing solution having a Saybolt viscosity of between 140 and 150 seconds at 100° F., which had been refrigerated to 10° C., were introduced into a Venturi scrubber of the above description at the inlet tube located 0.1 inch downstream of the throat. Simultaneously, a 2.00 cubic foot per minute stream of the gaseous mixture containing hydrogen peroxide and formaldehyde was passed through the Venturi scrubber. After the rapid intermixing of the white mineral oil and the gaseous mixture, the resulting mixture of liquid and gases leaving the Venturi scrubber was immediately passed into a cyclone type separator of the above description. After the rapid separation of the liquid phase from the gaseous phase, it was found that the quantity of hydrogen peroxide contained in the liquid phase equaled 81.0 weight percent of the amount contained in the gaseous mixture entering the scrubber.

Various modifications may be made with regard to the process without departing from the scope of the invention. For example, the scrubbing medium could be refrigerated to a temperature well below that mentioned, 10° C. Additionally, besides water and the particular white mineral oil illustrated above, other scrubbing media could be used. For instance, oils which readily flow at the velocities and low temperatures at which the separation is effected, exhibit low solubility for formaldehyde and acetaldehyde, and are substantially inert to hydrogen peroxide are also suitable for use in the present invention. Among such oils are the white mineral oils having a Saybolt viscosity of between about 50 and 250 seconds at 100° F. Slurries of an alkaline earth metal oxide or hydroxide which can form the corresponding peroxide on reaction with hydrogen peroxide can also be employed.

Numerous modifications as to physical and chemical arrangements may be made within the skill of the art without either circumventing or transcending the scope of this invention. All matter contained in the above description or shown in the accompanying drawings shall be interpreted as illustrative and not limitative.

What is claimed is:

1. In the separation of hydrogen peroxide from a gaseous mixture comprising acetaldehyde, formaldehyde and hydrogen peroxide, the improvement which comprises passing said gaseous mixture into a Venturi tube, introducing a scrubbing medium into said Venturi tube at a rate whereby substantially complete intermixing with said gaseous mixture is achieved, and subjecting the resultant gaseous phase and peroxide-bearing phase to a separation to rapidly remove the peroxide-bearing phase from the gaseous phase within about one minute after the formation of said peroxide-bearing phase.

2. In the separation of hydrogen peroxide from a gaseous mixture comprising acetaldehyde, formaldehyde and hydrogen peroxide, the improvement which comprises passing said gaseous mixture into an apparatus capable of mixing a gas with a liquid rapidly and substantially completely, introducing therein a scrubbing medium at a rate whereby complete intermixing between said scrubbing medium and said gaseous mixture is achieved, and subjecting the resultant gaseous phase and peroxide-bearing phase to a separation to rapidly remove the peroxide-bearing phase from the gaseous phase within about one minute after the formation of said peroxide-bearing phase.

3. In the separation of hydrogen peroxide from a gaseous mixture comprising acetaldehyde, formaldehyde and hydrogen peroxide, the improvement which comprises passing said gaseous mixture into an acceleration tube capable of mixing a gas with a liquid rapidly and substantially completely, introducing therein a scrubbing medium at a rate whereby complete intermixing between said scrubbing medium and said gaseous mixture is achieved, and subjecting the resultant gaseous phase and peroxide-bearing phase to a separation to rapidly remove the peroxide-bearing phase from the gaseous phase within about one minute after the formation of said peroxide-bearing phase.

4. In the separation of hydrogen peroxide from a gaseous mixture comprising acetaldehyde, formaldehyde and hydrogen peroxide, the improvement which comprises passing said gaseous mixture into a Venturi tube, introducing a scrubbing medium into said Venturi tube at a rate whereby substantially complete intermixing with said gaseous mixture may be had on the order of about 0.1 second, rapidly subjecting the resultant gaseous phase and peroxide-bearing phase to a centrifugal separation, separating therefrom the peroxide-bearing phase, and maintaining the temperature from the intermixing of said gaseous stream with said scrubbing medium to the separation of the peroxide-bearing phase from the gaseous phase below about 20° C.

5. The process of claim 4 wherein the scrubbing medium comprises a freshly slaked lime slurry.

6. The process of claim 4 wherein the scrubbing medium comprises water.

7. The process of claim 4 wherein the scrubbing medium comprises a white mineral oil having a Saybolt viscosity of between about 50 and 250 seconds at 100° F.

8. The process of claim 4 wherein the temperature is maintained between about 0° C. and 10° C.

References Cited in the file of this patent

UNITED STATES PATENTS 2,533,581  Harris _____ Dec. 12, 1950

OTHER REFERENCES

Perry: "Chemical Engineers' Handbook," 3rd edition, 1950, pages 1024, 1203.